UNITED STATES PATENT OFFICE.

ORWIN B. MONNETT, OF BUCYRUS, OHIO.

SHEEP-DIP.

SPECIFICATION forming part of Letters Patent No. 319,990, dated June 16, 1885.

Application filed June 16, 1884. (No specimens.)

*To all whom it may concern:*

Be it known that I, ORWIN BRUCE MONNETT, a citizen of the United States, residing at Bucyrus, in the county of Crawford and State of Ohio, have invented a new and useful composition of matter to be used for the prevention and healing of diseases in the feet of sheep, and for the foot and mouth disease in cattle, and all cutaneous diseases of sheep and cattle.

My composition consists of the following ingredients, combined in the proportions stated, viz: pure water, one hundred gallons; blue vitriol, ten and one-half pounds; gas-lime, sixteen bushels. These ingredients are to be mingled as follows: Filter the pure water through the given quantity of gas-lime, and mingle the blue vitriol, thoroughly granulated or pulverized, with the leach or lye by thoroughly agitating the composition, and the whole will form a new chemical compound.

In using the above compound or composition the foot of the animal is to be cleansed from all hard substance surrounding immediately the affected part, and apply the composition by dipping and allowing the diseased portion to become thoroughly permeated with the liquid, the same application to be repeated at intervals of three to six days, according to the stage of the disease, until healed.

In cutaneous diseases or membraneous affections, it is to be applied by a sponge or other suitable swab, cleansing first the affected parts with water, and to be repeated at the expiration of six days, diluting with pure water, according to the stage of the disease, the same application made once as a preventive in all cases.

I am aware that various compositions have been long in use in which blue vitriol in composition with salt, sulphur, and pure water have been in use for foot-diseases in sheep; but I am not aware that all or any of the above ingredients have ever been used in composition with gas-lime or filtrations from gas-lime in the proportions stated, or any other proportions, to be used for any of the above diseases, or any disease.

What I claim, and desire to secure by Letters Patent of the United States, is—

The herein-described composition of matter, to be used in preventing and healing diseases in the skin and feet of sheep and the foot and mouth diseases of cattle, consisting of water, gas-lime, and blue vitriol, in the proportions specified.

O. B. MONNETT.

Witnesses:
GEORGE M. ZIEGLER,
J. C. TOBIAS.